United States Patent
Rose et al.

(10) Patent No.: US 10,735,388 B2
(45) Date of Patent: Aug. 4, 2020

(54) CONFINING DATA BASED ON LOCATION

(71) Applicant: LENOVO (Singapore) PTE. LTD., New Tech Park (SG)

(72) Inventors: Amy Leigh Rose, Chapel Hill, NC (US); William Laurence Jaeger, Jr., Pittsboro, NC (US); David Burke Stone, Wake Forest, NC (US); Christopher Aaron Whitesock, Clayton, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 185 days.

(21) Appl. No.: 15/073,197

(22) Filed: Mar. 17, 2016

(65) Prior Publication Data

US 2017/0272412 A1  Sep. 21, 2017

(51) Int. Cl.
*H04L 29/06* (2006.01)
*H04L 9/08* (2006.01)
*H04W 12/00* (2009.01)

(52) U.S. Cl.
CPC ........ *H04L 63/0492* (2013.01); *H04L 9/0872* (2013.01); *H04L 63/0428* (2013.01); *H04L 63/061* (2013.01); *H04L 63/102* (2013.01); *H04L 63/20* (2013.01); *H04W 12/00503* (2019.01)

(58) Field of Classification Search
CPC .... H04L 63/0492; H04L 63/061; H04L 63/20

USPC ........................................... 713/154
See application file for complete search history.

(56) References Cited

U.S. PATENT DOCUMENTS

| | | | |
|---|---|---|---|
| 2003/0217151 A1* | 11/2003 | Roese | G01S 5/02 709/225 |
| 2006/0236363 A1* | 10/2006 | Heard | H04L 63/101 726/1 |
| 2007/0250930 A1* | 10/2007 | Aziz | G06F 21/554 726/24 |
| 2014/0082348 A1* | 3/2014 | Chandrasekaran | H04L 63/0254 713/150 |
| 2016/0173623 A1* | 6/2016 | Broussard | H04L 63/107 713/168 |

\* cited by examiner

*Primary Examiner* — Eleni A Shiferaw
*Assistant Examiner* — Angela R Holmes
(74) *Attorney, Agent, or Firm* — Kunzler Bean & Adamson

(57) ABSTRACT

For confining data to particular set of data servers based on a location restriction of the data, systems, apparatus, methods, and program products are disclosed. The apparatus may include a storage device for storing data, a processor, and a memory that stores code executable by the processor. In one embodiment, the processor identifies a location restriction of the data, encrypt. In another embodiment, the processor encrypts the data. In a further embodiment, the processor confines the data to particular set of data servers based on the location restriction.

20 Claims, 6 Drawing Sheets

CONFINING DATA BASED ON LOCATION

BACKGROUND

Field

The subject matter disclosed herein relates to storing data on a data server and more particularly relates to confining the data to particular set of data servers based on location.

Description of the Related Art

Many entities, such as governments, have requirements to geographically isolate data to certain locations, thereby keeping the data within the government's boundaries (e.g., within a geographic territory controlled by the government). Also, many enterprises desire to control the physical location of their data, yet still desire the benefits of the cloud computing environment. Currently, there are no methods for locking down data to specific geographic location.

BRIEF SUMMARY

An apparatus for confining data based on location is disclosed. A method and computer program product also perform the functions of the apparatus.

The apparatus may include a storage device for storing data, a processor, and a memory that stores code executable by the processor, the code causing the processor to: identify a location restriction of the data, encrypt the data, and confine the data to a particular set of data servers based on the location restriction.

In some embodiments, the apparatus includes a network interface that receives additional encrypted data, the encrypted data having a second location restriction, and that temporarily stores the additional encrypted data. In such embodiments, the processor may discard the encrypted data in response to the location property of the storage device not matching the second location restriction.

In certain embodiments, the processor confining the data to a particular set of data servers based on the location restriction includes the processor identifying a location property of a target server and preventing transfer of the data in response to the location property not matching the location restriction. In some embodiments, the processor identifying the location restriction of the data includes one of: the processor examining metadata of the data and the processor examining a data transfer policy belonging to an owner of the data. In certain embodiments, the processor identifying the location restriction of the stored data includes the processor determining whether a label belonging to the data indicates a location restriction.

The method may include identifying, by use of a processor, a location restriction of data, encrypting the data, and confining the data to a particular set of data servers based on the location restriction. In some embodiments, the method also includes receiving a second location restriction for additional encrypted data. In such embodiments, the method may include determining whether a location property of the storage device matches the second location property and downloading the additional encrypted data in response to the location property of the storage device matching the second location restriction.

In certain embodiments, the method includes identifying a current location of the data, wherein encrypting the data includes encrypting the data using an encryption key based on the current location of the data. In some embodiments, the method includes identifying a location property of a data server, comparing the location property to the location restriction of the data, and providing the data server with an encryption key for decrypting the data based on the comparison. In certain embodiments, the method includes labeling the data based on the location restriction, wherein identifying the location restriction of the stored data comprises determining whether the label belonging to the data indicates a location restriction.

In some embodiments, the confining the data to a particular set of data servers based on the location restriction includes: identifying a location property of a target server, transferring the data to the target server in response to the location property matching the location restriction, and preventing transfer of the data to the target server in response to the location property not matching the location restriction. In certain embodiments, identifying the location restriction of the data includes one of: examining metadata of the data and examining a data transfer policy belonging to an owner of the data.

In certain embodiments, identifying the location restriction of the data includes determining whether the data includes a restriction flag. In some embodiments, the location restriction is one of: a physical location, a network location, a logical administrative domain, and a set of physical hardware. In some embodiments, the location restriction indicates that the data is to be restricted to a locale selected from: a nation, a province, a state, a city, and a continent. In certain embodiments, the data includes one of a virtual machine and virtual machine data.

The computer program product includes a computer readable storage medium that stores code executable by a processor, the executable code including code to perform: identifying a location restriction of data, encrypting the data, and confining the data to a particular set of data servers based on the location restriction.

In certain embodiments, the executable code includes code to perform: identifying a location property of a data server, comparing the location property to the location restriction of the data, and providing the data server with an encryption key for decrypt the data based on the comparison. In further embodiments, the executable code includes code to perform: labeling the data based on the location restriction, and identifying a current location of the data, wherein encrypting the data includes encrypting the data using an encryption key that is based on the current location of the data. In some embodiments, confining the data to a particular set of data servers based on the location restriction includes restricting transfer of the data to a target device based on a location of the target device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
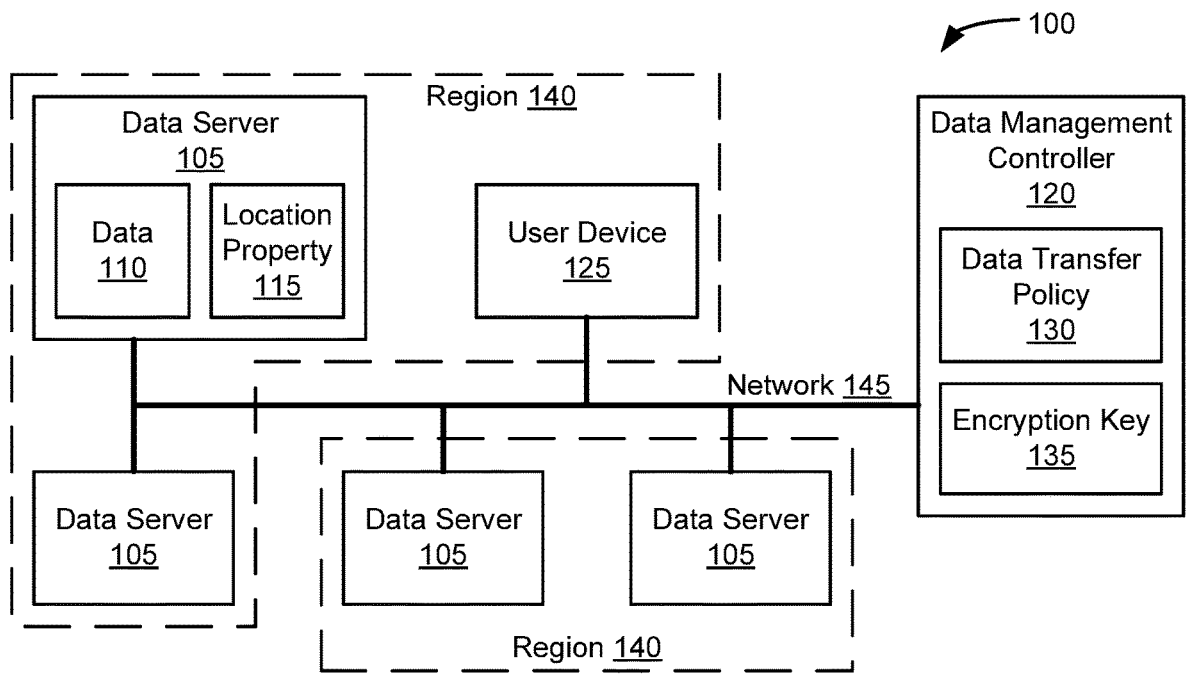
FIG. 1A is a schematic block diagram illustrating one embodiment of a system for confining data based on location.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein allow data or datasets to be locked to a certain server that is located in the specific location. Transfer policies may be implemented to restrict the data/data sets to the specified location. Further, encryption methodologies, such as a pre-shared key ("PSK"), may be used to protect the data/datasets, where only servers that are located at the specified location are given the key to unencrypt the data. Encrypting the data/datasets and restricting distribution of the encryption keys, prevents accidental migration of the data/datasets to a server that is outside of the correct location, as the transferred information is unintelligible without the encryption keys.

FIG. 1A is a schematic block diagram illustrating a data storage system 100 for confining data based on location, according to embodiments of the disclosure. The data storage system 100 comprises a plurality of data servers 105 for storing data 110, each data server being associated with a location property 115. In some embodiments, the data storage system 100 also includes one or more data management controllers 120, which govern storage and transfer of data 110 between the data servers 105.

The system 100 includes one or more user devices 125, which generate and utilize the data 110 stored in the data servers 105. For example, the user device 125 may generate and utilize virtual machine data which is then stored on a data server 105. The data servers 105 and user device 125 may be located in a particular region 140. In some embodiments, the location property 115 identifies a region 140 in which the data server 105 is located. The data servers 105, data management controller 120, and user device(s) 125 are communicatively connected via a communication network 145.

In one embodiment, the location property 115 indicates a geographic location (e.g., a physical region 140) where the data server 105 resides. In another embodiment, the location property 115 indicates a network location (e.g., a virtual region 140) of the data server 105. In yet another embodiment, the location property 115 indicates a network administrative domain to which the data server 105 belongs. In still another embodiment, the location property 115 indicates a set of hardware identifiers (e.g., processor, motherboard, network interface, nonvolatile data storage device, etc.) for the data server 105. The set of hardware identifiers identifies a set of hardware components which comprise the data server 105. In certain embodiments, the set of hardware components include some, but not all, hardware components which comprise the data server 105.

The data servers 105 receive, store, transfer, and otherwise manage data 110 stored therein. For example, a data server 105 may include a nonvolatile data storage device for storing the data 110. In one embodiment, the data 110 is user data belonging to a particular user/owner. In another embodiment, the data 110 is a virtual machine ("VM") operable on a user device 125. In yet another embodiment, the data 110 is virtual machine data. The data server 105 may receive data 110 from the data management controller 120, from a user device 125, and/or from another data server 105.

The data management controller 120, in one embodiment, controls the storage and the transfer of data 110 among the plurality of data servers 105 that form the data storage system 100. In some embodiments, the data management controller 120 instructs the data servers 105 to store, transfer, and/or delete data 105. In one embodiment, the data management controller 120 receives new data 110 for storage from a user device 125. In another embodiment, the data management controller 120 receives an indication from a data server 105 that a user device 125 has uploaded new data 110 for storage at the data server 105.

The data management controller 120 may track which data 110 is stored at which data servers 105. In some embodiments, the data management controller 120 may include a table, database, or other data structure for tracking locations of the data 110 and location restrictions for the data 110. In certain embodiments, the data management controller 120 may update the data structure as data 110 is moved among the data servers 105. The data management controller 120 may monitor and restrict transfers of data 110 among the plurality of data servers 105 based on the location restrictions of the data 110, thereby confining the data 110 to a particular set of data servers 105. The data management controller 120 may store one or more data transfer policies 130 and one or more an encryption keys 135.

As used herein, a data transfer policy refers to a set of rules to guide decisions for transferring and storing data. A data transfer policy 130 may include a location restriction applicable to all the data 110 belonging to a user/owner identified by the data transfer policy 130. In some embodiments, each user that stores data at a data server 105 may have a unique data transfer policy 130 belonging to that user. In certain embodiments, a generic data transfer policy 130 may be used unless/until a user provides a specific (e.g., non-generic) data transfer policy 130. The data management controller 120 may store one or more data transfer policies 130 relating to one or more users of the data storage system 100.

Each encryption key 135 is used to encrypt and/or decrypt data. Each encryption key 135 is location specific. In one embodiment, each encryption key 135 corresponds to a location restriction. In another embodiment, each encryption key 135 corresponds to a particular region 140 managed by the data storage system 100. Data 110 located in a particular region 140 is encrypted/decrypted using the encryption key 135 corresponding to that region 140.

The data management controller 120 controls distribution of the encryption keys 135 based on the location property 115 of the data server 105. In one embodiment, the data management controller 120 only distributes an encryption key 135 for a particular set of data 110 based on the location restriction of the data 110. In another embodiment, the data management controller 120 only distributes an encryption key 135 to a data server 105 that is located in the region 140 corresponding to the encryption key. By controlling distribution of the encryption keys 135, the data management controller 120 ensures that encrypted data 110 is confined to particular set of data servers 105 based on the location restriction of the data 110.

Figure 1B:
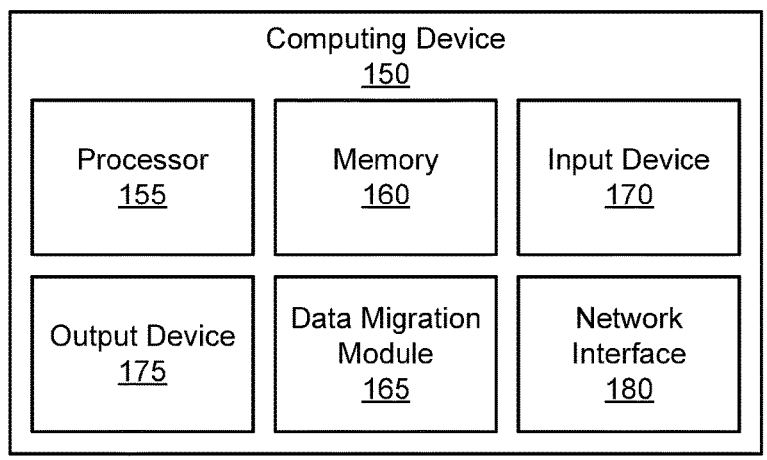
FIG. 1B is a schematic block diagram illustrating one embodiment of a computing device for confining data based on location.

FIG. 1B is a schematic block diagram illustrating a computing device 150 for confining data based on location, according to embodiments of the disclosure. The computing device 150 may be any digital device capable of executing computing processes using a microprocessor, microcontroller, or other processing device, including, but not limited to, a general-purpose computing device, a special-purpose (dedicated) computing device, and the like.

In certain embodiments, the computing device 150 may be an embodiment of a data server 105. In other embodiments, the computing device 150 may be an embodiment of a data management controller 120. Examples of a computing device 150 include, but are not limited to, a server, a mainframe computer, a personal computer, a mobile phone, a smart phone, a tablet computer, a laptop computer, a handheld computer, a wearable computer, a gaming console, and the like. In one embodiment, the computing device 150 includes a processor 155, a memory 160, a data migration module 165, an input device 170, an output device 175, and a network interface 180.

The processor 155, in one embodiment, may comprise any known controller capable of executing computer-readable instructions and/or capable of performing logical operations. For example, the processor 155 may be a microcontroller, a microprocessor, a central processing unit (CPU), a graphics processing unit (GPU), an auxiliary processing unit, a FPGA, or similar programmable controller. In certain embodiments, the processor 155 may include a plurality of processing units, such as a plurality processing cores, a plurality of CPUs, a plurality of microcontrollers, or the like.

In some embodiments, the processor 155 executes instructions stored in the memory 160 to perform the methods and routines described herein. The processor 155 is communicatively coupled to the memory 160, the data migration module 165, the input device 170, the output device 175, and the network interface 180.

The memory 160, in one embodiment, is a computer readable storage medium. In some embodiments, the memory 160 includes volatile computer storage media. For example, the memory 160 may include a random access memory (RAM), including dynamic RAM (DRAM), synchronous dynamic RAM (SDRAM), and/or static RAM (SRAM). In some embodiments, the memory 160 includes non-volatile computer storage media. For example, the memory 160 may include a hard disk drive, a flash memory, or any other suitable non-volatile computer storage device. In some embodiments, the memory 160 includes both volatile and non-volatile computer storage media.

In some embodiments, the memory 160 stores additional data relating to confining data 110 based on location. For example, the memory 160 may store an encryption key, a location property 115, a location restriction, and the like. In certain embodiments, the memory 160 is a storage device for storing the data 110 to be protected (e.g., user data, a virtual machine, and/or virtual machine data). In some embodiments, the memory 160 also stores program code and related data, such as an operating system or other controller algorithms operating on the computing device 150.

The data migration module 165, in one embodiment, identifies a location restriction of data 110 stored at a storage device (e.g., stored at the memory 160). The data 110 may include user data, a virtual machine, and/or virtual machine data. The location restriction may be indicated by a restriction flag included with the data 110, by metadata of the data 110, by a label belonging to the data 110, and/or by a data transfer policy belonging to an owner of the data 110. In one embodiment, the data transfer policy may indicate a particular nation, province, state, city, and/or continent to which the data 110 may be transferred. In another embodiment, the data transfer policy may indicate a particular nation, province, state, city, and/or continents which the data 110 may not be transferred.

The data migration module 165 additionally encrypts the data 110 based on the location restriction and confines the data 110 to a particular set of data servers 105 based on the location restriction. The data migration module 165 may encrypt the data 110 based on a current location (e.g., region 140) of the data 110. In certain embodiments, the data migration module 165 additionally labels the data 110 based on the location restriction. In some embodiments, the data migration module 165 stores a restriction flag in the data 110.

In certain embodiments, the computing device 150 receives additional data 110, wherein the data migration module 165 checks a location restriction of the additional data. If the location property 115 of the computing device 150 does not match the location restriction of the additional data 110, then the data migration module 165 discards (e.g., deletes or overwrites) the additional data 110. However, if the location property 115 of the computing device 150 matches the location restriction of the additional data 110, then the data migration module 165 may store the additional data 110 in non-volatile storage (e.g., in the memory 160).

In some embodiments, the computing device 150 may receive a transfer inquiry relating to encrypted data 110, the transfer inquiry indicating a location restriction of the encrypted data 110. The data migration module 165 may verify that a location property 115 of the computing device 150 matches the location restriction in the transfer inquiry before accepting the data transfer via a transfer response. For example, a first data server 105 may send a transfer inquiry to a second data server 105, wherein a data migration module 165 in the second data server checks the location restriction within the transfer inquiry before either accepting the data transfer or rejecting the data transfer via a transfer response.

In one embodiment, the transfer inquiry may indicate the location restriction by referencing an encryption key 135 used to encrypt the data 110 that is the subject of the transfer inquiry. The data migration module 165 accepts the data transfer only if it has access to the referenced encryption key 135. In the previous example, the first data server 105 may reference an encryption key 135 used to encrypt the data 110 to be transferred, wherein the second data server 105 determines whether it has the referenced encryption key 135 stored in memory 160. If the second data server 105 has the correct encryption key 135, then it will accept the data transfer. Otherwise, the second data server 105 will reject the data transfer.

In some embodiments, the second data server 105 sends proof of the reference encryption key 135 in the transfer response to the first data server 105. For example, the transfer inquiry may include an encrypted token which was encrypted using the same encryption key referenced in the transfer inquiry. The data migration module 165 of the second data server 105 may decrypt the token and return the unencrypted token to the first data server 105 in the transfer response, thus proving access to the referenced encryption key 135.

Alternatively, the transfer inquiry may include an encrypted token but no reference to an encryption key used to encrypt the token. The data migration module 165 may attempt to decrypt the encrypted token using all its stored encryption key. The second data server 105 may send a transfer response that includes all versions of the decrypted token (e.g., sends a decryption result for each stored encryption key 135). If the first data server 105 recognizes the correct token in the transfer response, then it proceeds with transferring the data 110 to the second data server 105. Otherwise, the first data server 105 aborts the data transfer to the second data server 105.

In certain embodiments, the data migration module 165 may receive additional encrypted data 110 and determine whether the data migration module 165 has an encryption key for the data 110. In one embodiment, unencrypted metadata (e.g., tag, label) indicates a location restriction for the data 110 and the data migration module 165 determines which encryption key 135 is to be used to decrypt the data 110 based on the location restriction. If the data migration module 165 has the correct encryption key 135, it will keep the additional data 110. Otherwise, the data migration module 165 may discard (e.g., delete) the additional data 110 in response to not having the correct encryption key 135.

In some embodiments, the data migration module 165 confines the data 110 to a particular set of data servers 105 based on the location restriction by identifying a location property 115 of a target server and preventing transfer of the protected data 110 (e.g., the data 110 encrypted based on the location restriction) if the location property 115 of the target server does not match the location restriction. The data migration module 165 may examine metadata of the protected data 110, a data label belonging to the protected data 110, and/or a data transfer policy belonging to an owner of the protected data 110 in order to identify the location restriction.

Embodiments of the data migration module 165 are described in further detail below. In some embodiments, the data migration module 165 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The input device 170, in one embodiment, may comprise any known computer input device including a touch panel, a button, a keyboard, and the like. The input device 170 is configured to receive input from a user, for example touch input, key press input, and the like. In certain embodiments, the input device 170 may include a microphone or other suitable device for receiving voice input from the user. For example, the user may speak one or more commands, wherein input device 170 receives the one or more commands as voice input.

In one embodiment, the input device 170 includes a touch-sensitive portion, such as a touch-sensitive input panel, configured to receive touch input from the user, such as an input gesture. In some embodiments, at least the touch-sensitive portion of the input device 170 may be integrated with the output device 175, for instance as a touchscreen or similar touch-sensitive display.

The output device 175, in one embodiment, may comprise any known electronic display capable of outputting visual data to a user. As used herein, the output device 175 refers to a physical, electronic display component of the computing device 150. For example, the output device 175 may be an LCD display, an LED display, an OLED display, a projector, or similar display device capable of outputting images, text, characters, and the like to a user. The output device 175 may display a user interface, such as a graphical user interface (GUI). In one embodiment, the user interface may include one or more windows.

In some embodiments, the output device 175 may be integrated with at least a portion of the input device 170. For example, the output device 175 and a touch panel of the input device 170 may be combined to form a touchscreen or similar touch-sensitive display. The output device 175 may receive data for display from the processor 155, the memory 160, and/or the data migration module 165.

The network interface 180, in one embodiment, is configured to communicate with one or more external modules, computers, data repositories, or other nodes on the network 145. The network interface 180 may be wired and/or wireless. Similarly, the network 145 may be a wired network, a wireless network, and/or may include both wireless and wired portions. The network interface 180 may comprise communication hardware and/or communication software for communicating with nodes on the network 145.

In some embodiments, one or more instructions may be received at the computing device 150 and via the network interface 180. In other embodiments, data 110 may be received via the network interface 180, including user data, virtual machines, virtual machine data, encryption keys, and the like. In one embodiment, a first data server 105 may communicate with a second data server 105 and/or with a data management controller 120 via the network interface 180. In another embodiment, a data management controller 120 may communicate with one or more data servers 105 via the network interface 180.

Figure 2:
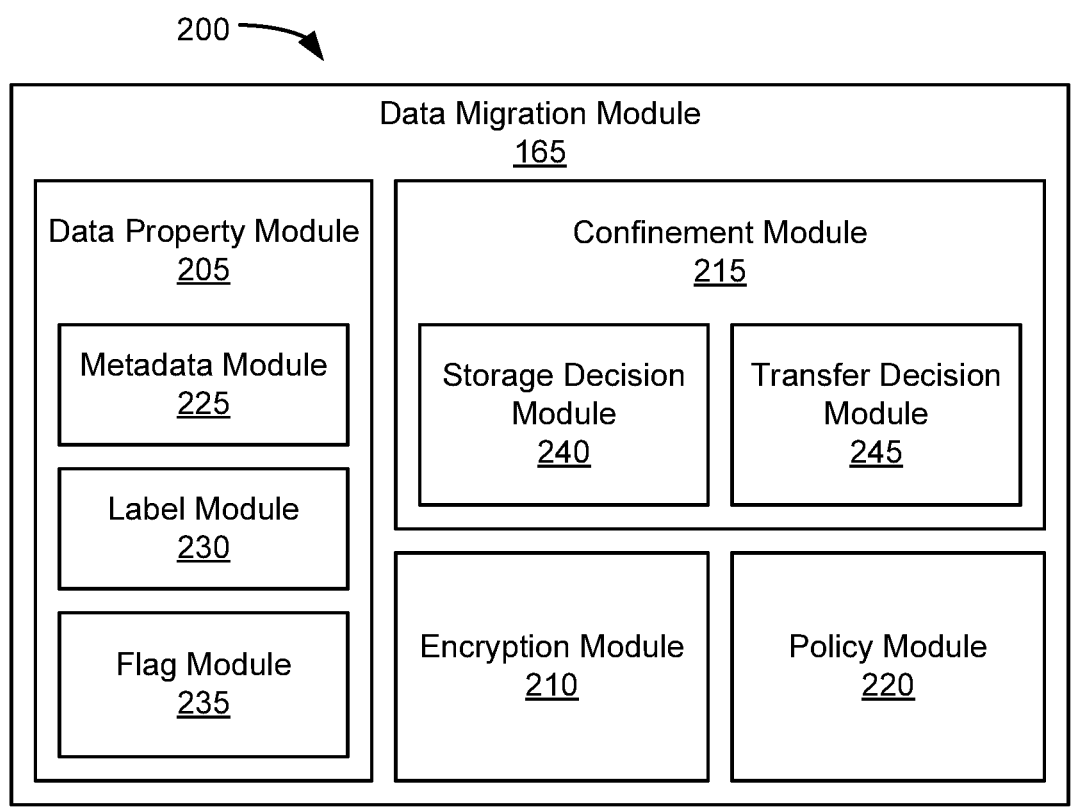
FIG. 2 is a schematic block diagram illustrating one embodiment of an apparatus for confining data based on location.

FIG. 2 is a schematic block diagram illustrating an apparatus 200 for confining data based on location, according to embodiments of the disclosure. The apparatus 200 includes a data migration module 165, which may be one embodiment of the data migration module 165 described above with reference to FIG. 1B. The data migration module 165 includes a data property module 205, an encryption module 210, and a confinement module 215. As depicted, the data migration module 165 may also include one or more of: a policy module 220, a metadata module 225, a label module 230, a flag module 235, a storage decision module 240, and a transfer decision module 245. The modules 205-245 may be communicatively coupled to one another. The data migration module 165 may comprise hardware circuits, program code operating on a processing device, or a combination of hardware circuitry and program code.

The data property module 205, in one embodiment, is configured to identify a location restriction of the data 110. As used herein, a location restriction refers to a restriction on transferring the data 110 to a particular location. In some embodiments, the data property module 205 may indicate the location restriction to the encryption module 210 and/or the confinement module 215. In other embodiments, the data property module 205 may store the location restriction in memory 160. The data property module 205 may comprise hardware circuits, program code operating on a processing device, or a combination of hardware circuitry and program code.

In one embodiment, the location restriction indicates one or more locations to which the data 110 may be transferred. In another embodiment, the location restriction indicates one or more locations to which the data 110 may not be transferred. In a further embodiment, the location restriction may indicate both locations to which the data 110 may be transferred and locations to which the data 110 may not be transferred.

In other embodiments, the location restriction may indicate that the data 110 may be freely transferred to any location.

In some embodiments, the data property module 205 identifies the location restriction of data 110 stored in a nonvolatile storage device, such as the memory 160. In other embodiments, the data property module 205 may identify a location restriction of data 110 stored in a volatile storage device, such as a buffer or other storage of temporary data. The data property module 205 may identify the location restriction based on metadata belonging to the data 110, a label of the data 110, a protection flag included in the data 110, and/or a data transfer policy belonging to an owner of the data 110. The data property module 205 may include a metadata module 225, a label module 230, and/or a flag module 235, as discussed in greater detail below.

In certain embodiments, the data property module 205 identifies a current location of the data 110. Where the data migration module 165 is located in a data server 105, the current location of the data 110 may be a current location of the data server 105. Where the data migration module 165 is located in a data management controller 120, the current location of the data 110 may be a location of a data server 105 currently storing the data 110. In some embodiments, the data property module 205 may indicate the current location to the encryption module 210 and/or the confinement module 215. In other embodiments, the data property module 205 may store the current location in memory 160.

In some embodiments, the data property module 205 may include a metadata module 225 that identifies and accesses metadata of the data 110. The metadata module 225, in one embodiment, may access the metadata to identify a location restriction for the data 110. In certain embodiments, the metadata module 225 may also access the metadata to identify an owner of the data 110.

The metadata module 225 may comprise hardware circuits, program code operating on a processing device, or a combination of hardware circuitry and program code. As depicted, the metadata module 225 may be a component of the data property module 205. For example, the metadata module 225 may be a hardware component of the data property module 205. As another example, the metadata module 225 may be a subroutine of the data property module 205. However, in other embodiments the metadata module 225 may be an independent component communicatively coupled to the data property module 205.

In some embodiments, the data property module 205 may include a label module 230 that indicates and/or identifies a location restriction of the data 110 using one or more labels. As used herein, a data label refers to a "tag" or other label belonging to the data 110 which indicates a property of the data 110. In one embodiment, a data label may be metadata tag stored with the data 110. In other embodiments, a data label may be a tag linked to the data 110, for example in a lookup table. The label module 230, in one embodiment, determines whether a particular set of data 110 has a label and, if so, determines whether a label belonging to the data indicates a location restriction.

In certain embodiments, the label module 230 may tag uploaded data 110 with a label to indicate a location restriction for the data 110. For example, the label module 230 may append unencrypted metadata to the data 110 after it is encrypted upon upload. As another example, label module 230 may create an entry in a lookup table which associates the data 110 with a tag or label, wherein the tag or label indicates a location restriction for the associated data 110.

The label module 230 may comprise hardware circuits, program code operating on a processing device, or a combination of hardware circuitry and program code. As depicted, the label module 230 may be a component of the data property module 205. For example, the label module 230 may be a hardware component of the data property module 205. As another example, the label module 230 may be a subroutine of the data property module 205. However, in other embodiments the label module 230 may be an independent component communicatively coupled to the data property module 205.

In some embodiments, the data property module 205 may include a flag module 235 that searches for a restriction flag included in the data 110. The flag module 235, in one embodiment, determines whether the data 110 includes a restriction flag. As used herein, a restriction flag is a piece of data that indicates whether the data 110 is subject to a location restriction. In one embodiment, upon detecting that a particular set of data 110 includes a restriction flag, the flag module 235 queries a policy module 220 for a data transfer policy 130 belonging to an owner, so as to identify the location restriction.

In certain embodiments, the flag module 230 may append the restriction flag to uploaded data 110 subject to a location restriction. For example, the location restriction may be identified using a data transfer policy 130 belonging to the owner uploading the data 110, wherein the flag module 230 appends a restriction flag based on the data transfer policy 130. In some embodiments, the restriction flag is readable even when the data 110 is encrypted. For example, the unencrypted restriction flag may be appended to the uploaded data 110 after it is encrypted. As another example, the restriction flag may be a part of header information for a data unit encapsulating the encrypted data 110.

The flag module 235 may comprise hardware circuits, program code operating on a processing device, or a combination of hardware circuitry and program code. As depicted, the flag module 235 may be a component of the data property module 205. For example, the flag module 235 may be a hardware component of the data property module 205. As another example, the flag module 235 may be a subroutine of the data property module 205. However, in other embodiments the flag module 235 may be an independent component communicatively coupled to the data property module 205.

The encryption module 210, in one embodiment, is configured to encrypt the data 110 based on the location restriction. For example, the location restriction may indicate with that the data 110 is to be restricted to a specific location. If the data 110 is to be location-restricted, then the encryption module 210 encrypts the data 110. For example, the encryption module 210 may encrypt the data using an encryption key that is based on a current location of the data. Specifically, a different encryption key may exist for each geographic region, network location, administrative domain, or the like managed by the data migration module. The encryption module 210 may select the appropriate encryption key (e.g., from a set of predefined encryption keys) based on the current location of the data and encrypt the data. Alternatively, the encryption module 210 may select the encryption key based on a location of a user device 125 that uploads the data 110, a user profile of an owner of the data 110, or at random. In some embodiments, the encryption key may be based on a shared secret, such as a pre-shared key.

In some embodiments, the encryption module 210 may store the encryption key(s) in the memory 160. The encryption module 210 may further map a particular location to each stored encryption key. In certain embodiments, the encryption module 210 may share an encryption key with one or more data servers 105 in response to the data server 105 being located at the location mapped to the encryption key. The encryption module 210 may comprise hardware circuits, program code operating on a processing device, or a combination of hardware circuitry and program code.

In certain embodiments, the encryption module 210 determines whether it is able to decrypt encrypted data 110, such as data 110 stored in the memory 160 or in a buffer of the network interface 180. For example, the encryption module 210 may determine whether it has access to an encryption key for encrypting data 110 stored in the memory 160. In response to the encryption module 210 being unable to decrypt the encrypted data 110, the encryption module 210 may initiate deletion of the undecryptable data 110. For example, the encryption module 210 may itself delete the undecryptable data 110. As another example, the encryption module 210 may signal the data migration module 165, an operating system, or other data manager, to delete the undecryptable data 110.

The confinement module 215, in one embodiment, confines the data 110 to a particular set of data servers 105 based on the location restriction. The particular set of data servers 105 all have a location property 115 which complies with the location restriction. The confinement module 215 may compare a location property 115 of a target (e.g., a transfer target and/or a storage target) for the data 110 to the location restriction in order to confine the data 110 to a particular set of data servers 105.

In certain embodiments, the confinement module 215 receives an indication of the location restriction from the data property module 205. In other embodiments, the confinement module 215 accesses a location in memory 160 storing the location restriction. The confinement module 215 may also receive a location property 115 of a target location (e.g., a storage target and/or a transfer target) from the target location and/or access a location in memory 160 story the location property 115.

In one embodiment, the confinement module 210 determines whether to transfer the data 110 based on whether a transfer target belongs to the particular set of data servers 105. In another embodiment, the confinement module 215 determines whether to store received data 110 based on whether a storage target belongs to the particular set of data servers 105. The confinement module 215 may comprise hardware circuits, program code operating on a processing device, or a combination of hardware circuitry and program code.

In some embodiments, the confinement module 215 may include a storage decision module 240 which determines whether to store incoming data 110 based on a location restriction of the incoming data 110. Accordingly, the storage decision module 240 may determine whether to store (e.g., in non-volatile storage media) or discard (e.g., delete or overwrite) incoming data 110 at a data server 105 based on the location restriction. The storage decision module 240 identifies the location restriction. For example, the storage decision module 240 may query the data property module 205 to identify the location restriction. As another example, the storage decision module 240 may access a location in the memory 160 storing the location restriction.

In some embodiments, the storage decision module 240 identifies a location property 115 of a storage target for the data 110. As used herein, a storage target refers to an intended storage location. The storage target may be a data server 105 containing the data migration module 165 (and the storage decision module 240). Alternatively, the storage target may be a storage device managed (e.g., remotely) by the data migration module 165. The location property 115 may be a physical (geographic) location of the storage target, a network, administrative domain, or other virtual location of the storage target, and/or a specific set of hardware comprising the storage target. The storage decision module 240 may query the storage target for its location property 115 or, alternatively, access a location in the memory 160 storing the location property 115 of the storage target.

The storage decision module 240 compares the location restriction to the location property 115 of the storage target. In one embodiment, the location restriction is a set or range of allowable storage locations for the data 110. If the location property 115 matches an allowable storage location (indicated by the location restriction), then the storage decision module 240 approves storage of the data 110.

Otherwise, the storage decision module 240 determines to delete or otherwise discard the data 110.

In another embodiment, the location restriction is a set or range of unacceptable (e.g., restricted) storage locations for the data 110. If the location property 115 is included in the location restriction, then the storage decision module 240 determines to discard (e.g., delete) the data 110. Otherwise, the storage decision module 240 approves storage of the data 110. In some embodiments, the storage decision module 240 itself either stores or discards the data 110. In other embodiments, the storage decision module 240 signals a data management entity (such the data migration module 165, the confinement module 215, an operating system, or other data management entity) to store or discard the data 110.

The storage decision module 240 may comprise hardware circuits, program code operating on a processing device, or a combination of hardware circuitry and program code. As depicted, storage decision module 240 may be a component of the confinement module 215. For example, the storage decision module 240 may be a hardware component of the confinement module 215. As another example, the storage decision module 240 may be a subroutine of the confinement module 215. However, in other embodiments the storage decision module 240 may be an independent component communicatively coupled to the confinement module 215.

In some embodiments, the confinement module 215 confines data 110 to a particular set of data servers based on the location restriction by preventing transfer of the data 110 to a data server 105 not belonging to the particular set of data servers. Accordingly, the confinement module 215 may include a transfer decision module 245 which determines whether to transfer data 110 based on a location restriction associated with the data 110.

In some embodiments, the confinement module 215 may include a transfer decision module 245 which determines whether to transfer data 110 based on a location restriction of with the data 110. Accordingly, the transfer decision module 245 may prevent transfer of the data 110 to a target data server 105 based on the location restriction. The transfer decision module 245 identifies the location restriction. For example, the transfer decision module 245 may query the data property module 205 to identify the location restriction. As another example, the transfer decision module 245 may access a location in the memory 160 storing the location restriction.

In some embodiments, the transfer decision module 245 identifies a location property 115 of a target data server 105. As used herein, a target data server 105 refers to an intended recipient of the data 110. The location property 115 may be a physical (geographic) location of the storage target, a network, administrative domain, or other virtual location of the storage target, and/or a specific set of hardware comprising the storage target. The transfer decision module 245 may query the target data server 105 for its location property 115 or, alternatively, access a location in the memory 160 storing the location property 115 of the target data server 105.

The transfer decision module 245 compares the location restriction to the location property 115 of the target data server 105. In one embodiment, the location restriction is a set or range of allowable storage locations for the data 110. If the location property 115 matches an allowable storage location (indicated by the location restriction), then the transfer decision module 245 approves transfer of the data 110. Otherwise, the transfer decision module 245 denies (e.g., prevents) transfer of the data 110 to the target data server 105.

In another embodiment, the location restriction is a set or range of unacceptable (e.g., restricted) storage locations for the data 110. If the location property 115 is included in the location restriction, then the transfer decision module 245 denies transfer of the data 110. Otherwise, the transfer decision module 245 approves transfer of the data 110 to the target data server 105. The transfer decision module 245 may signal approval/disapproval to the data migration module 165, the confinement module 215, an operating system running on the electronic device 105, or other data transfer entity.

In certain embodiments, the transfer decision module 245 determines whether to accept transfer of additional data 110 based on a location restriction of the data 110. For example, where the transfer decision module 245 is embodied in a data server 105, the transfer decision module 245 may receive a location restriction for incoming (encrypted) data 110. The transfer decision module 245 compares the location restriction to the location property 115 for the data server 105.

In response to the location property 115 matching the location restriction, the transfer decision module 245, the confinement module 215, and/or the data migration module 165 downloads the additional data 110. In one embodiment, the transfer decision module 245 receives a transfer inquiry, wherein the location restriction is included in the transfer inquiry. Transfer inquiries and responses thereto are discussed above with reference to FIG. 1B. The transfer decision module 245 may send a transfer response initiating the data transfer and/or download the additional data 110 upon analyzing the transfer inquiry.

The transfer decision module 245 may comprise hardware circuits, program code operating on a processing device, or a combination of hardware circuitry and program code. As depicted, transfer decision module 245 may be a component of the confinement module 215. For example, the transfer decision module 245 may be a hardware component of the confinement module 215. As another example, the transfer decision module 245 may be a subroutine of the confinement module 215. However, in other embodiments the transfer decision module 245 may be an independent component communicatively coupled to the confinement module 215.

The policy module 220, in one embodiment, is configured to identify a data transfer policy 130 belonging to the owner of the data 110. As used herein, an "owner" of the data 110 refers to the entity on whose behalf the data 110 is stored at a data server 105. The owner of the data 110 is the entity with rights to access the data 110, download the data 110, modify the data 110, and delete the data 110 from all data servers 105. In certain embodiments, the policy module 220 identifies the data transfer policy 130 in response to a signal from the data property module 205, and returns to the data property module 205 one of: the data transfer policy 130 and a location restriction included in the data transfer policy 130.

In one embodiment, the owner of the data 110 is the user or organization that uploads the data 110. For example, if the data 110 is user data, then the owner of the data 110 may be the user that uploads the data 110 to the data server 105. As another example, if the data 110 is a virtual machine or virtual machine data, then the owner of the data 110 may be the user that uploads the VM or VM data. In another embodiment, the owner of the data 110 is the creator of the data 110. For example, if the data 110 is user data, then the owner of the data 110 may be the creator of that user data.

The policy module 220, in some embodiments, identifies an owner of the data 110 and retrieves a data transfer policy 130 belonging to the identified owner. In certain embodiments, the data 110 may indicate its owner, for example using metadata. In other embodiments, a lookup table (e.g., stored on the data management controller 120) may correlate a set of data 110 with an owner. Where the policy module 220 is located on a data server 105, the policy module 220 may query the data management controller 120 via the network interface 180 to identify an owner of the data 110. The policy module 220 may further query the memory 160 and/or the data management controller 120 for a data transfer policy 130 belonging to the owner.

In certain embodiments, the policy module 220 parses the data transfer policy 130 to identify a location restriction. As discussed above, a location restriction in a data transfer policy 130 applies to all data belonging to in owner/user identified by the data transfer policy 130. In other embodiments, the policy module 220 passes the data transfer policy 130 to the data property module 205, wherein the data property module 205 examines the data transfer policy to identify the location restriction. The policy module 220 may comprise hardware circuits, program code operating on a processing device, or a combination of hardware circuitry and program code.

Figure 3A:
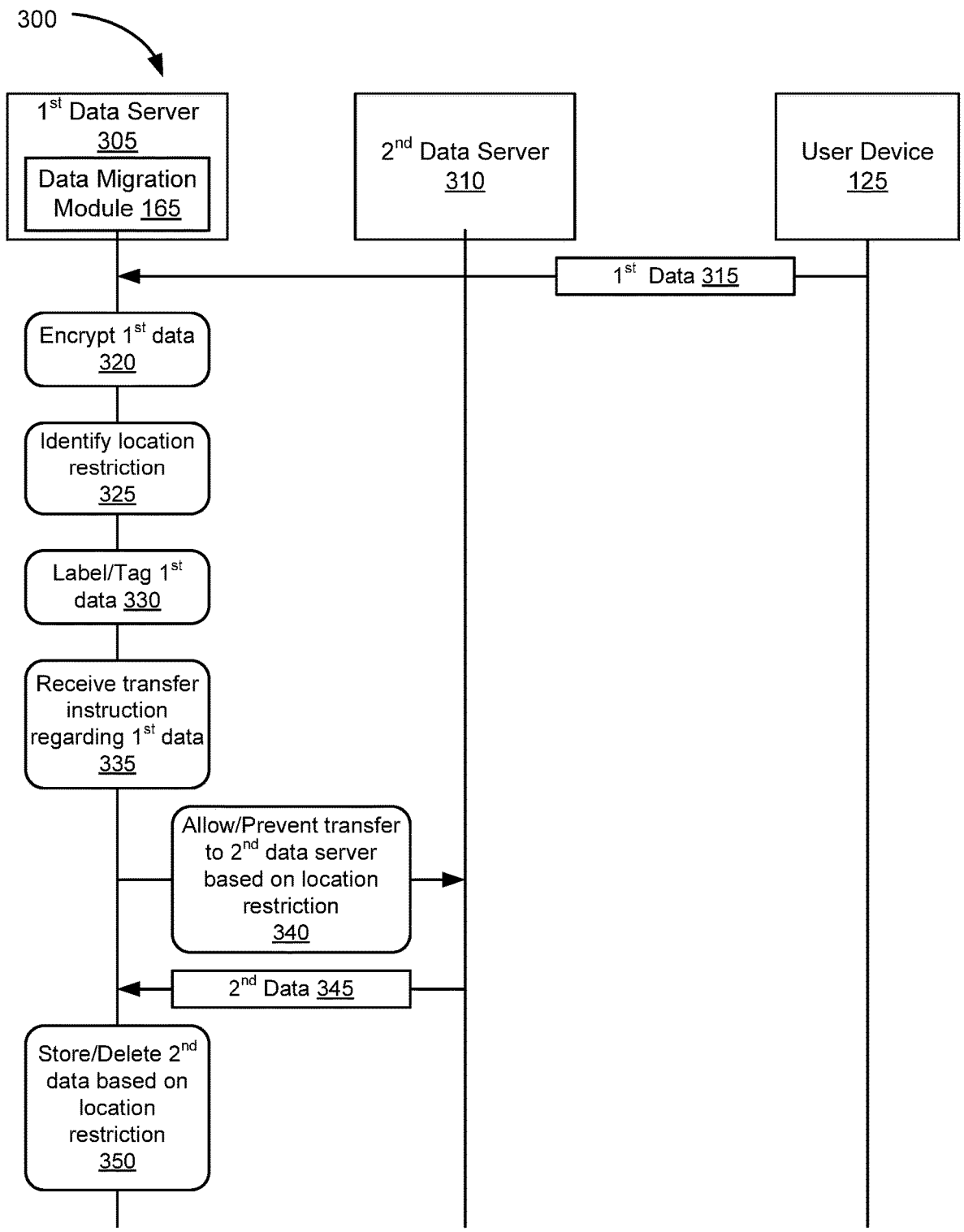
FIG. 3A is a block diagram illustrating one embodiment of confining data based on location.
Figure 3B:
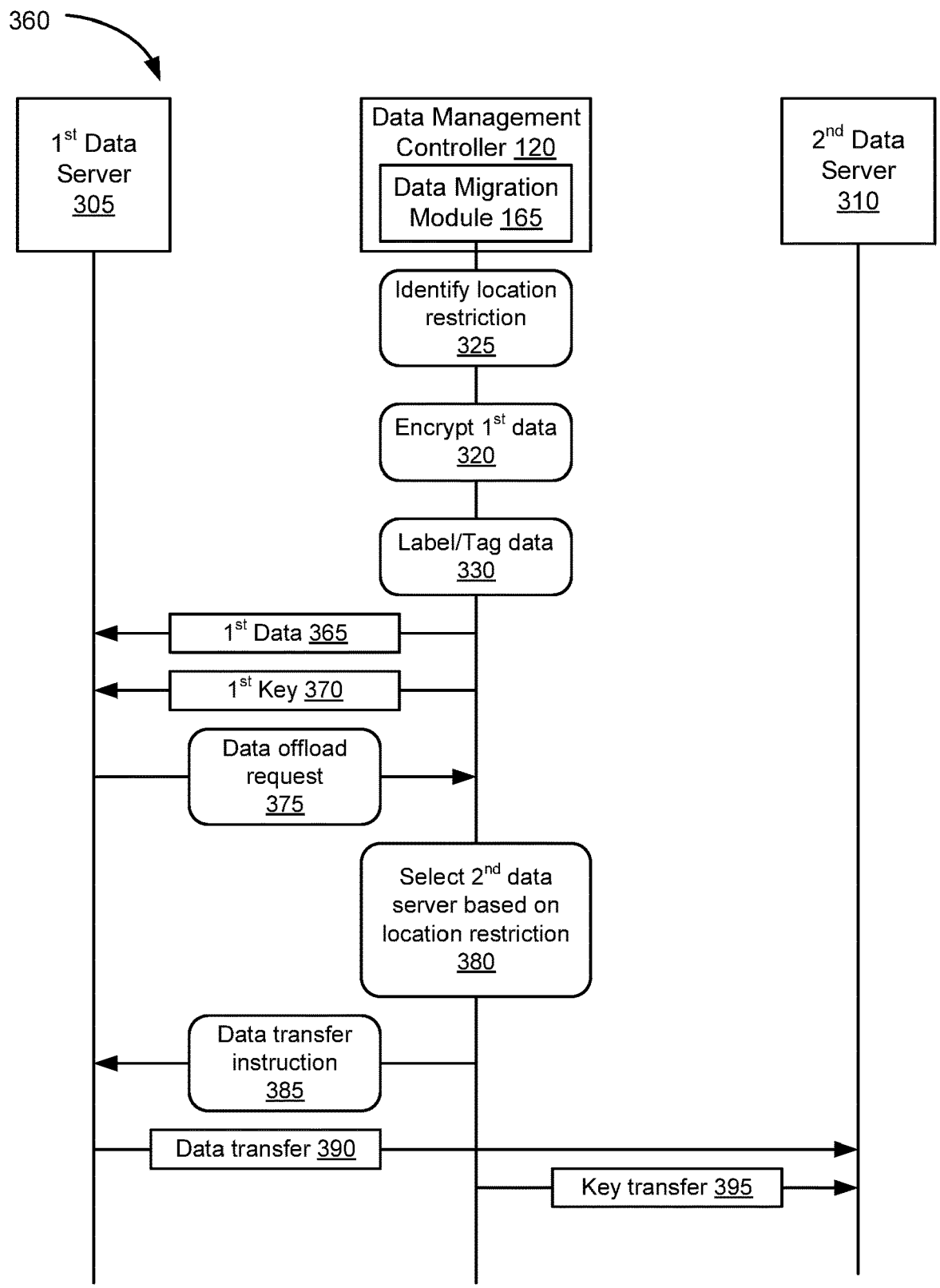
FIG. 3B is a block diagram illustrating another embodiment of confining data based on location.

FIGS. 3A-3B are block diagrams illustrating confining data to a set of data servers based on a location restriction of the data. FIG. 3A illustrates actions by and communications between a first data server 305 a second data server 310, and a user device 125. As depicted, the first data server 305 includes a data migration module 165. In certain embodiments, the second data server 310 may also include a data migration module 165 (not shown). The data migration modules 130 may be embodiments of the data migration modules 130 discussed above with reference to FIGS. 1-2. The user device 125 is a computing device operated by user for creating, modifying, and/or using data 110, such as user data, virtual machine data, or a virtual machine. Examples of a user device 125 include, but are not limited to, a server, a mainframe computer, a personal computer, a mobile phone, a smart phone, a tablet computer, a laptop computer, a handheld computer, a wearable computer, a gaming console, and the like.

The user device 125 uploads first user data (block 315) to the first data server 305. The first data server 305 may include a network interface 180, wherein the first data is received at the first data server 305 via the network interface 180. The data migration module 165 encrypts the first data (block 320). In one embodiment, the data migration module 165 selects an encryption key 135 from a set of predefined encryption keys 135, the selection based on the location of the user device 125 and/or the location of the first data server 305. In another embodiment, the data migration module 165 selects an encryption key 135 based on a user profile associated with the user device 125 or selects a random encryption key 135.

The data migration module 165 of the first data server 305 may identify a location restriction of the first data (block 325). In one embodiment, identifying a location restriction of the first data includes identifying a location property, such as a current location of the user device 125. In another embodiment, identifying a location restriction of the first data includes identifying a location property of the first data server 305, such as a physical location, a network location, an administrative domain, etc. In certain embodiments, identifying the location restriction of the first data includes identifying a data transfer policy 135 for a user of the user device 125 and/or an owner of the first data. The data migration module 165 optionally labels and/or tags the first data to indicate the location restriction (block 330).

In one embodiment, the location restriction indicates that the first data is to be confined to a geographic region, such as a city, state, province, nation, where the user device 125 is located and/or where the owner of the first data resides. The encryption key may be selected that corresponds to the geographic region. In another embodiment, the location restriction indicates the first data is to be confined to a network location or a specific set of hardware, wherein an encryption key is selected that corresponds to the network location or hardware set. In a further embodiment, the encryption key may belong to the owner of the first data, may be indicated by the data transfer policy belonging to the owner, or may be selected at random.

At some point, the first data server 305 receives a transfer instruction (e.g., from a data management entity) regarding the first data (block 335). In one embodiment, the transfer instruction is for balancing storage levels among a plurality of data servers 105, including the first data server 305 and the second data server 310. In another embodiment, the transfer instruction is for redundant storage of the first data. The transfer instruction may specify a specific data server 105 to which the first data server 305 is to transfer the first data. Here, the data transfer instruction indicates a transfer to the second data server 310.

The data migration module 165 the first data server 305 either allows or prevents transfer of the first data to the second data server 310 based on a location restriction of the first data (block 340). As the first data is to be confined to a particular set of data servers based on the location restriction, the data migration module 165 of the first data server 305 determines whether the second data server 310 is included in the particular set of data servers. In one embodiment, the data migration module 165 identifies a location property of the second data server 310, compares the location property of the second data server 310 to the location restriction of the first data, allows transfer the first data to the second data server 310 if the location property complies with location restriction (thus indicating that the second data server 310 belongs to the particular set of data servers), and prevents transfer of the first data to the second data server 310 if the location property does not match (e.g., comply with) the location restriction.

At another point, the first data server 305 receives second data from the second data server 310 (block 345). The second data having a second location restriction. In certain embodiments, the received second data is encrypted. In one embodiment, the first data server 305 temporarily stores the second data.

The data migration module 165 of the first data server 305 then either stores or discards the second data based on the second location restriction (block 350). In some embodiments, the data migration module 165 identifies a location property of the first data server 305, such as a geographic location, a network location, and administrative domain, and the like. The data migration module 165 may then compare the location property to the second location restriction. If the location property of the first data server 305 matches (e.g., complies with) the second location restriction, then the data migration module 165 permanently stores the second data at the first data server 305. The data aggression module 30 may also request an encryption key (e.g., from a data management controller 120) for decrypting the second data. Otherwise, if the location property does not match the second location restriction, then the data migration module 165 discards the second data.

FIG. 3B illustrates actions by and communications between a first data server 305 a second data server 310, and a data management controller 120. As depicted, the data management controller 120 includes a data migration module 165. In certain embodiments, the first data server 305 and/or the second data server 310 may optionally include a data migration module 165 (not shown). The data migration modules 130 may be embodiments of the data migration modules 130 discussed above with reference to FIGS. 1-2.

The data migration module 165 (of the data management controller 120) identify a location restriction of a first set of data (block 325). In one embodiment, identifying a location restriction of the first data includes identifying a current location of the first set of data, such as a particular data server 105 storing the first set of data. In another embodiment, identifying the location restriction of the first set of data includes identifying a data transfer policy 135 belonging to an owner of the first set of data.

The data migration module 165 encrypts the first set of data, for example encrypting based on the location restriction (block 320). In one embodiment, the data migration module 165 selects an encryption key from a set of predefined encryption keys, for example based on the location restriction. Having encrypted the first set of data, the data migration module 165 optionally labels and/or tags the first set of data to indicate the location restriction (block 330). As discussed above, the labels/tags may be metadata appended to the first set of data, a header/footer of the data unit encapsulating the encrypted first set of data, or the like.

In one embodiment, the location restriction indicates that the first set of data is to be confined to a geographic region, such as a city, state, province, nation, where the first set of data is currently located and/or where the owner of the first set of data resides. The encryption key may be selected that corresponds to the geographic region. In another embodiment, the location restriction indicates the first set of data is to be confined to a network location or a specific set of hardware, wherein an encryption key is selected that corresponds to the network location or hardware set. In a further embodiment, the encryption key may belong to the owner of the first set of data, may be indicated by the data transfer policy belonging to the owner, or may be selected at random.

At some point, the data management controller 120 transfers the first set of data to the first data server 305 (block 365). In some embodiments, the data management controller 125 selects the first data server 305 due to a location property of the first data server 305 matching the location restriction of the first set of data. However, if the location property of the first data server 305 does not match (e.g., comply with) the location restriction of the first set of data, then the data migration module 165 prevents transfer of the first set of data to the first data server 305.

After transferring the first set of data, the data management controller 120 distributes a first key to the first data server 305 in response to the location property of the first data server 305 matching the location restriction of the first set of data (block 370). The first key allows decryption of the first set of data. The data migration module 165 identifies a location property of the first data server 305, compares the location property to the location restriction of the first set of data, and provides the first data server 305 with the first key only if the location property complies with (e.g., matches) the location restriction.

At some point, the first data server 305 sends a request to offload data to the data management controller 120 (block 375). The first data server 305 may send the request in response to exceeding a threshold storage capacity level, in response to a ratio of occupied storage space to total storage space exceeding a threshold ratio, or in response to identifying a storage error at the first data server 305. In response to receiving the data offload request, the data management controller 120 selects another data server 105 for offloading data from the first data server 305. The data management controller 120 may select a data server 105 based on location restrictions of sets of data stored at the first data server 305.

Here, the data management controller 120 selects the second data server 310 based on a location property of the second data server (e.g., a geographic location, a network location, administrative domain, or the like) matching the location restriction(s) of one or more sets of data stored at the first data server 305. In response to selecting the second data server 310, the data management controller 120 sends a data transfer instruction to the first data server 305 (block 385). The data transfer instruction may include a transfer target (the second data server 310) and may further identify one or more sets of data to transfer to the target.

Upon receiving the data transfer instruction, the first data server 305 transfers the indicated set(s) of data to the second data server 310 (block 390). The data management controller 120 also distributes one or more encryption keys to the second data server 310 (block 395). The distributed encryption key(s) permitting the second data server 310 to decrypt the set(s) of data received from the first data server 305 (block 395). Because a location property of the second data server 310 matches the location restriction of the set(s) of data transferred to the second data server 310, the data management controller 120 can safely distribute encryption keys. In some embodiments, the data migration module 165 verifies that the second data server 310 has a location property matching the location restriction(s) before distributing the encryption key(s).

Figure 4:
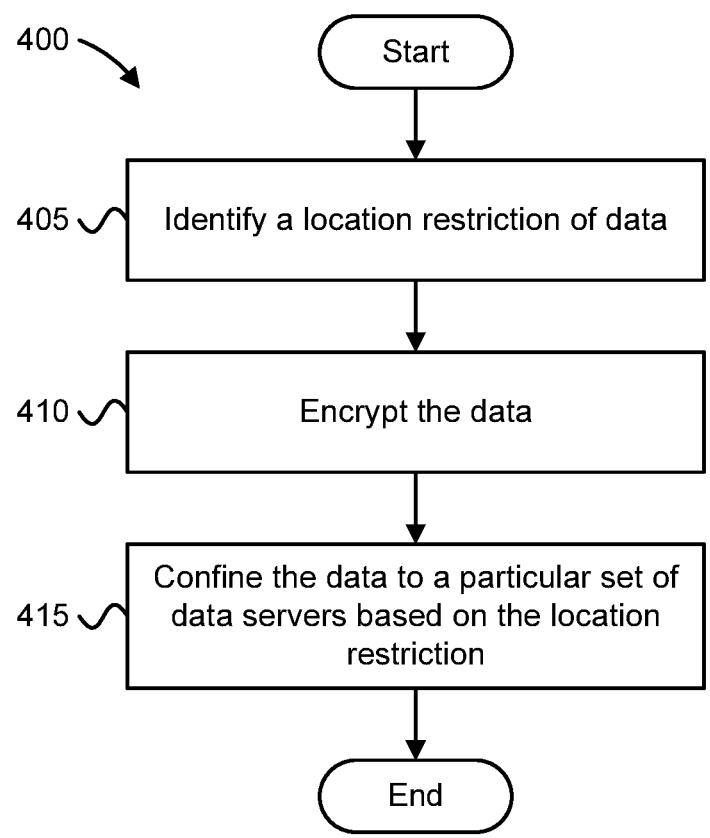
FIG. 4 is a schematic flow chart diagram illustrating one embodiment of a method for confining data based on location.

FIG. 4 is a schematic flow chart diagram illustrating a method 400 for confining data based on location, according to embodiments of the disclosure. In one embodiment, the method 400 is performed by the computing device 150. In another embodiment, the method 400 may be performed by the apparatus 200. Alternatively, the method 400 may be performed by a processor 155 and a computer readable storage medium, such as the memory 160. The computer readable storage medium may store code that is executed on the processor 155 to perform the functions of the method 400.

The method 400 begins and identifies 405 a location restriction of data. In one embodiment, the data property module 205 identified 405 the location restriction. In certain embodiments, the location restriction indicates that the data is to be restricted to a particular nation, province, state, city, or continent. In other embodiments, the location restriction indicates the data is to be restricted to a set of data servers belonging to the same logical administrative domain.

In some embodiments, identifying 405 the location restriction includes determining whether a restriction flag included with the data and/or a label belonging to the data indicates a location restriction. In certain embodiments, identifying 405 the location restriction includes examining one or more of the metadata of the data and a data transfer policy belonging to an owner of the data. In one embodiment, the location restriction is a physical location, a network location, a logical administrative domain, or a set of physical hardware.

The method 400 encrypts 410 the data. In one embodiment, the encryption module 210 encrypts 410 the data, for example based on the location restriction. In some embodiments, encrypting 410 the data includes identifying a current location of the data and selecting an encryption key based on the current location of the data. In certain embodiments, encrypting 410 the data includes encrypting the data using a shared secret.

The method 400 confines 415 the data to a particular set of data servers based on the location restriction and the method 400 ends. In one embodiment, the confinement module 215 confines 415 the data to a particular set of data servers based on the location restriction. In some embodiments, confining 415 data to a particular set of data servers based on the location restriction includes preventing transfer of the data to a data server not belonging to the particular set of data servers. In certain embodiments, confining 415 data to a particular set of data servers based on the location restriction includes preventing transfer of an encryption key used to encrypt/decrypt the data to a data server not belonging to the particular set of data servers.

While FIG. 4 depicts the method identifying 405 the location restriction prior to encrypting 410 the data, in other embodiments encrypting 410 the data may occur independently of identifying 405 the location restriction. For example, data 110 may be automatically encrypted 410 upon uploading from a user device 125. As another example, the data 110 may be encrypted 410 (e.g., by the encryption module 210) at the same time as the location restriction is identified 405 (e.g., by the data property module 205). In such embodiments, the encryption key 135 used to encrypt 410 the uploaded data 110 may be based on a location of the uploading user device 125, a location of a data server 105 to which the data 110 is uploaded, and/or a user profile of the uploader.

Figure 5:
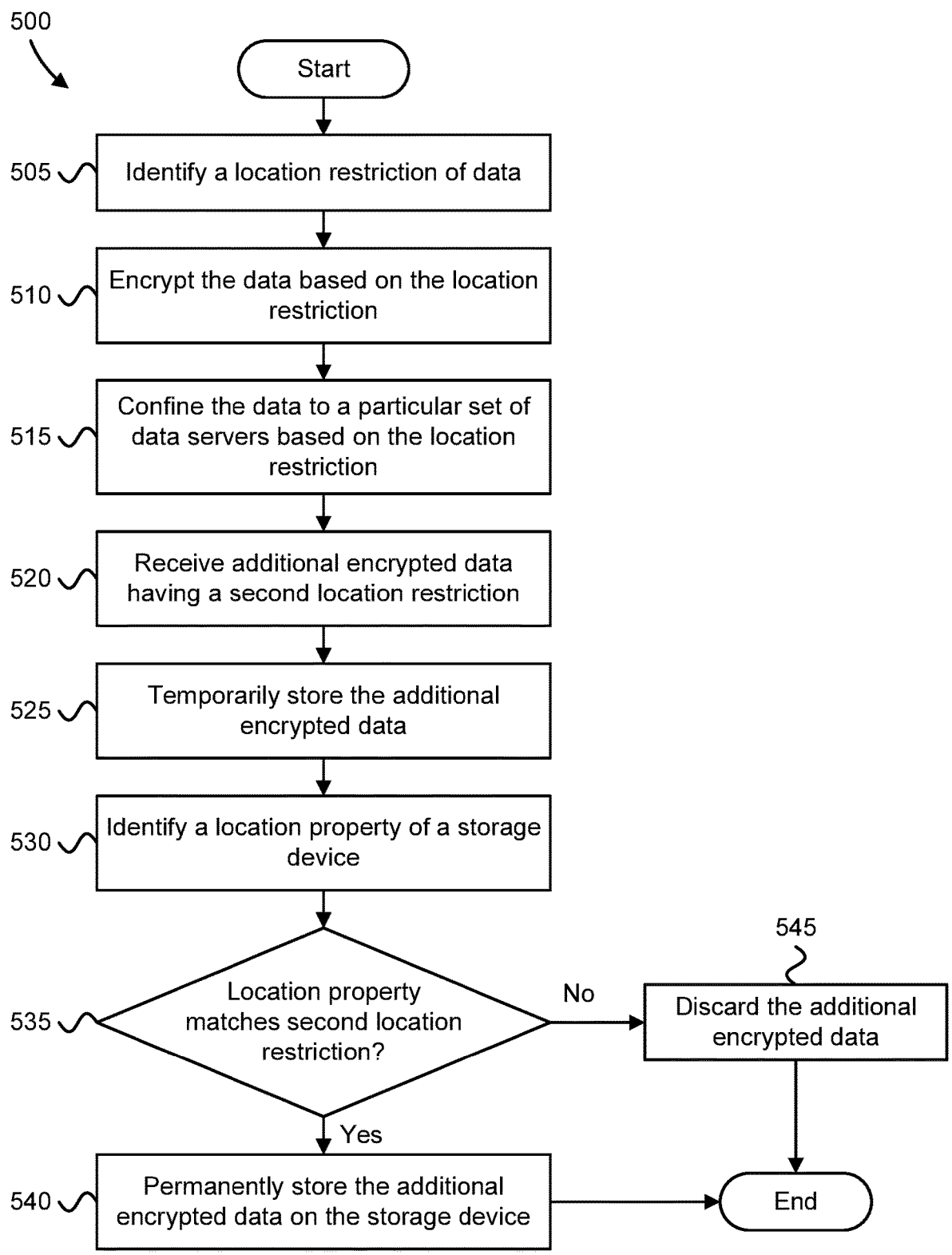
FIG. 5 is a schematic flow chart diagram illustrating another embodiment of a method for confining data based on location.

FIG. 5 is a schematic flow chart diagram illustrating a method 500 for confining data based on location, according to embodiments of the disclosure. In one embodiment, the method 500 is performed by the computing device 150. In another embodiment, the method 500 may be performed by the apparatus 200. Alternatively, the method 500 may be performed by a processor 155 and a computer readable storage medium, such as the memory 160. The computer readable storage medium may store code that is executed on the processor 155 to perform the functions of the method 500.

The method 500 begins and identifies 505 a location restriction of data. In one embodiment, the data property module 205 identifies 505 the location restriction. In certain embodiments, the location restriction indicates that the data is to be restricted to a particular nation, province, state, city, or continent. In other embodiments, the location restriction indicates the data is to be restricted to a set of data servers belonging to the same logical administrative domain.

In some embodiments, identifying 505 the location restriction includes determining whether a restriction flag included with the data and/or a label belonging to the data indicates a location restriction. In certain embodiments, identifying 505 the location restriction includes examining one or more of the metadata of the data and a data transfer policy belonging to an owner of the data. In one embodiment, the location restriction is a physical location, a network location, a logical administrative domain, or a set of physical hardware.

The method 500 encrypts 510 the data based on the location restriction. In one embodiment, the encryption module 210 encrypts 510 the data based on the location restriction. In some embodiments, encrypting 510 the data based on the location restriction includes identifying a current location of the data and selecting an encryption key based on the current location of the data. In certain embodiments, encrypting 510 the data based on the location restriction includes encrypting the data using a shared secret.

While FIG. 5 depicts the method identifying 505 the location restriction prior to encrypting 510 the data based on the location restriction, in other embodiments encrypting data 110 may occur independently of identifying 505 the location restriction. For example, data 110 may be automatically encrypted upon uploading from a user device 125. As another example, the data 110 may be encrypted (e.g., by the encryption module 210) at the same that the location restriction is identified 505 (e.g., by the data property module 205). In such embodiments, the encryption key 135 used to encrypt the uploaded data 110 may be based on a location of the uploading user device 125, a location of a data server 105 to which the data 110 is uploaded, and/or a user profile of the uploader.

The method 500 confines 515 the data to a particular set of data servers based on the location restriction. In one embodiment, the confinement module 215 confines 515 the data to a particular set of data servers based on the location restriction. In some embodiments, confining 515 data to a particular set of data servers based on the location restriction includes preventing transfer of the data to a data server not belonging to the particular set of data servers. In certain embodiments, confining 515 data to a particular set of data servers based on the location restriction includes preventing transfer of an encryption key used to encrypt/decrypt the data to a data server not belonging to the particular set of data servers.

The method 500 receives 520 additional encrypted data, the additional encrypted data having a second location restriction. In one embodiment, the network interface 180 receives 520 the additional encrypted data. The method 500 temporarily stores 525 the additional encrypted data. In one embodiment, a network interface 180 and/or the memory 160 temporarily stores 525 the additional encrypted data.

The method 500 identifies 530 a location property of the storage device. In one embodiment, the storage decision module 240 identifies 530 the location property of the storage device. In some embodiments, identifying 530 the location property of the storage device includes identifying a current location (e.g., physical, network) of a storage device of the receiver of the additional encrypted data. In other embodiments, identifying 530 the location property of the storage device includes identifying a target storage location for the additional encrypted data.

The method 500 determines 535 whether the location property matches the second location restriction. In response to the location property matching the second location restriction, the method 500 permanently stores 540 the additional encrypted data on the storage device. For example, the location restriction may indicate a set of permissible storage locations, wherein the additional encrypted data is permanently stored 540 in response to the location property belonging to the set of permissible storage locations. Otherwise, in response to the location property not matching the second location restriction, the method 500 discards 545 the additional encrypted data. The method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   identifying, by use of a processor, whether user data stored in a data storage system has a location restriction, wherein the data storage system comprises a plurality of data servers located in a plurality of geographic regions, wherein the location restriction indicates at least one of the plurality of geographic regions where the user data is not be stored, the location restriction indicating a first geographic region where the user data is permitted to be stored;
   encrypting the user data using a location-specific encryption key in response to the user data having a location restriction, the location-specific encryption key being common to a particular set of data servers belonging to the first geographic region and is not distributed outside the particular set of servers;
   associating the user data with a data transfer policy based on the location restriction in response to the user data having a location restriction;
   confining the user data to the particular set of data servers based on the data transfer policy in response to the user data having a location restriction;
   identifying a location property of a data server, the location property indicating a geographic location of the data server;
   comparing the location property to the location restriction of the user data; and
   providing the data server with the location-specific encryption key for decrypting the user data based on the comparison.

2. The method of claim 1, further comprising:
   receiving a second location restriction for additional encrypted data;
   downloading the additional encrypted data in response to a location property of the storage device matching the second location restriction.

3. The method of claim 1, further comprising identifying a current location of the user data, wherein the location-specific encryption key is selected from a set of predefined encryptions keys associated with the current location of the user data.

4. The method of claim 1, further comprising labeling the user data based on the location restriction, wherein identifying whether the user data has a location restriction comprises determining whether a label belonging to the user data indicates a location restriction.

5. The method of claim 1, wherein confining the user data to a particular set of data servers based on the location restriction comprises:
   identifying a location property of a target server, the location property indicating a geographic location of the target server;
   transferring the user data to the target server in response to the location property matching the location restriction; and
   preventing transfer of the user data to the target server in response to the location property not matching the location restriction.

6. The method of claim 1, wherein identifying whether the user data has a location restriction comprises one of examining metadata of the user data and examining a data transfer policy belonging to an owner of the user data.

7. The method of claim 1, wherein identifying whether the user data has a location restriction comprises determining whether the user data includes a restriction flag.

8. The method of claim 1, wherein the location restriction indicates that the user data is to be restricted to a geographic region selected from the group consisting of: a nation, a province, a state, a city, and a continent.

9. The method of claim 1, wherein the user data comprises one of a virtual machine and virtual machine data.

10. An apparatus comprising:
    a storage device for storing user data;
    a processor; and
    a memory that stores code executable by the processor to:
    identify whether the user data has a location restriction, wherein the location restriction indicates at least one of a plurality of geographic regions where the user data is not be stored, the location restriction indicating a first geographic region where the user data is permitted to be stored;
    encrypt the user data using a location-specific encryption key in response to the user data having a location restriction, wherein the location-specific encryption key is selected based on the first geographic region;
    associate the user data with a particular set of data servers belonging to the first geographic region, in response to the user data having a location restriction, the particular set of data servers selected based on the location restriction;
    share the user data with the particular set of data servers, the set of data servers being provided with the location-specific encryption key for decrypting the user data in response to a location property of a data server matching the location restriction of the user data, wherein the location property of a data server indicates a geographic location of said data server; and
    confine the user data to the particular set of data servers in response to the user data having a location restriction, wherein the location-specific encryption key is not distributed outside the particular set of data servers.

11. The apparatus of claim 10, further comprising:
    a network interface that:
       receives additional encrypted data, the additional encrypted data having a second location restriction; and
       temporarily stores the additional encrypted data;
    wherein the processor:
       discards the encrypted data in response to the location property of the storage device not matching the second location restriction, wherein the location property of the storage device indicates a geographic location of the apparatus.

12. The apparatus of claim 10, wherein the processor confining the user data to a particular set of data servers based on the location restriction comprises the processor:
    identifying a location property of a target server, the location property indicating a geographic location of the target server; and
    preventing transfer of the user data in response to the location property not matching the location restriction.

13. The apparatus of claim 10, wherein the processor identifying whether the user data has a location restriction comprises one of: the processor examining metadata of the user data and the processor examining a data transfer policy belonging to an owner of the user data.

14. The apparatus of claim 10, wherein the processor identifying whether the user data has a location restriction comprises the processor determining whether a label belonging to the user data indicates a location restriction.

15. A program product comprising a computer readable storage medium that is not a transitory signal and that stores code executable by a processor, the executable code comprising code to:
  determine whether user data stored in a data storage system has a location restriction, wherein the data storage system comprises a plurality of data servers located in a plurality of geographic regions, wherein the location restriction indicates at least one of the plurality of geographic regions where the user data is not be stored, the location restriction indicating a first geographic region where the user data is permitted to be stored;
  encrypt the user data using a location-specific encryption key in response to the user data having the location restriction, wherein the location-specific encryption key is selected based on the location restriction, wherein the location restriction is stored in unencrypted form with the encrypted user data;
  associate the user data with a particular set of data servers belonging to the first geographic region in response to the user data having the location restriction; and
  prevent transfer of the user data to a server not belonging to the set of data servers in response to the user data having a location restriction, wherein each data server of the set of data servers holds the location-specific encryption key, wherein the location-specific encryption key is not distributed outside the set of data servers;
  identify a location property of a data server, the location property indicating a geographic location of the data server;
  compare the location property to the location restriction of the user data;
  determine that the data server belongs to the particular set of data servers in response to the location property matching the location restriction; and
  provide the data server with an encryption key for decrypting the user data in response to the location property matching the location restriction.

16. The program product of claim 15, further comprising:
  labeling the user data based on the location restriction; and
  identifying a current location of the user data, wherein the location-specific encryption key is selected based on the current location of the user data.

17. The apparatus of claim 10, wherein the processor identifies a current location of the user data, wherein the location-specific encryption key is selected from a set of predefined encryptions keys associated with the current location of the user data.

18. The apparatus of claim 10, wherein the processor:
  receives a data transfer inquiry from a first data server in a data storage system, wherein the transfer inquiry indicates a second location restriction corresponding to second data,
  determines whether the apparatus complies with the second location restriction;
  accepts a data transfer for the second data in response to the apparatus complying with the second location restriction; and
  rejects a data transfer for the second data in response to the apparatus not complying with the second location restriction.

19. The apparatus of claim 10, wherein the processor labels the user data based on the location restriction, wherein identifying whether the user data has a location restriction comprises determining whether a label belonging to the user data indicates a location restriction.

20. The apparatus of claim 10, wherein the location restriction indicates that the user data is to be restricted to a geographic region selected from the group consisting of: a nation, a province, a state, a city, and a continent.

* * * * *